US010433572B2

(12) United States Patent
Timmermans et al.

(10) Patent No.: US 10,433,572 B2
(45) Date of Patent: Oct. 8, 2019

(54) PROCESS FOR FAST AND HOMOGENEOUSLY HEATING A LIQUID PRODUCT AND APPARATUS FOR SUCH PROCESS

(71) Applicant: Stichting Dienst Landbouwkundig Onderzoek, Wageningen (NL)

(72) Inventors: Rian Adriana Hendrika Timmermans, Wageningen (NL); Ricardo Ermirio De Moraes, Sao Paulo SP (BR); Hendrikus Cornelis Mastwijk, Bilthoven (NL); Ariette Margaretha Matser, Amersfoort (NL)

(73) Assignee: STICHTING WAGENINGEN RESEARCH, Wageningen (NL)

( * ) Notice: Subject to any disclaimer, the term of this patent is extended or adjusted under 35 U.S.C. 154(b) by 968 days.

(21) Appl. No.: 14/386,785

(22) PCT Filed: Mar. 19, 2013

(86) PCT No.: PCT/NL2013/050202
§ 371 (c)(1),
(2) Date: Sep. 19, 2014

(87) PCT Pub. No.: WO2013/141703
PCT Pub. Date: Sep. 26, 2013

(65) Prior Publication Data
US 2015/0050400 A1 Feb. 19, 2015

(30) Foreign Application Priority Data

Mar. 20, 2012 (BR) .......................... 1020120062631
Mar. 20, 2012 (EP) ..................................... 12160363

(51) Int. Cl.
*A23L 2/48* (2006.01)
*A23L 3/005* (2006.01)
(Continued)

(52) U.S. Cl.
CPC ................. *A23L 2/48* (2013.01); *A23B 5/01* (2013.01); *A23C 3/02* (2013.01); *A23L 3/005* (2013.01);
(Continued)

(58) Field of Classification Search
CPC .... A23L 3/005; A23L 3/32; C02F 1/48; C02F 2201/003; C02F 2303/04; C02F 2103/003; Y10S 99/14
See application file for complete search history.

(56) References Cited

U.S. PATENT DOCUMENTS 535,267 A * 3/1895 Wagner et al. ..... C02F 1/46109
204/275.1
2,836,699 A * 5/1958 Mullin .................... F24H 1/106
392/318
(Continued)

FOREIGN PATENT DOCUMENTS

EP 0 690 660 A1 1/1996
GB 0 297 669 A 12/1928
(Continued)

OTHER PUBLICATIONS

International Search Report of PCT/NL2013/050202 dated May 6, 2013.
(Continued)

*Primary Examiner* — Steven N Leff
(74) *Attorney, Agent, or Firm* — Gilberto M. Villacorta; Sunit Talapatra; Foley & Lardner LLP

(57) ABSTRACT

The invention relates to an apparatus for fast and homogeneously heating a liquid product to a heating temperature by means of resistive heating, the apparatus comprising at least two vertically mounted, longitudinal, heating chambers that are arranged in series. The invention further relates to a process for fast and homogeneously heating a liquid product to a heating temperature by means of resistive heating in
(Continued)

such apparatus comprising (a) continuously supplying the liquid product to the first heating chamber in series and flowing the liquid product continuously through the at least two heating chambers; (b) continuously generating an electrical current through the liquid product flowing through the heating chambers by continuously applying an electrical potential over each heating chamber, wherein the direction of the current is continuously alternated with a frequency of at least 500 Hz, to obtain heated liquid product; and (c) continuously discharging heated liquid product from the last heating chamber in series, wherein the liquid product has an electrical conductivity of at least 0.03 S/m.

27 Claims, 1 Drawing Sheet

(51) Int. Cl.
H05B 3/60 (2006.01)
A23B 5/01 (2006.01)
A23C 3/02 (2006.01)
A23L 3/01 (2006.01)

(52) U.S. Cl.
CPC .................. *A23L 3/01* (2013.01); *H05B 3/60* (2013.01); *A23V 2002/00* (2013.01)

(56) References Cited

U.S. PATENT DOCUMENTS

| | | | | |
|---|---|---|---|---|
| 3,666,917 A * | 5/1972 | Oglesby | ............... | F24H 1/106 392/311 |
| 4,695,472 A * | 9/1987 | Dunn | ............... | A23C 3/0335 426/237 |
| 5,290,583 A * | 3/1994 | Reznik | ............... | A23B 5/0055 219/771 |
| 5,562,024 A * | 10/1996 | Polny, Jr. | ............. | A23B 5/0055 99/451 |
| 5,583,960 A * | 12/1996 | Reznik | ............... | A23B 5/01 219/771 |
| 5,607,613 A * | 3/1997 | Reznik | ............... | A23B 5/01 219/771 |
| 5,690,978 A * | 11/1997 | Yin | ............... | A23L 3/00 426/237 |
| 5,776,529 A * | 7/1998 | Qin | ............... | A23L 3/005 426/231 |
| 5,863,580 A * | 1/1999 | Reznik | ............... | A23B 5/01 426/237 |
| 6,093,432 A * | 7/2000 | Mittal | ............... | A23C 3/00 422/186.04 |
| 6,214,297 B1 * | 4/2001 | Zhang | ............... | A23L 3/32 422/186 |
| 6,304,718 B1 | 10/2001 | Reznik | | |
| 6,421,501 B2 * | 7/2002 | Berthou | ............... | H05B 3/60 165/167 |
| 6,746,613 B2 * | 6/2004 | Korenev | ............... | A23L 3/32 204/164 |
| 7,050,706 B2 * | 5/2006 | Israelsohn | ............... | F24H 1/106 392/314 |
| 2001/0021308 A1* | 9/2001 | Berthou | ............... | H05B 3/60 392/314 |

FOREIGN PATENT DOCUMENTS

WO WO-2009/111640 A2 9/2009
WO WO-2011/139144 11/2011

OTHER PUBLICATIONS

Lelieveld, "Preservation of Food by Pulsed Electric Field Processing", Encyclopedia of Biotechnology in Agriculture and Food, 2011, pp. 1-4.

* cited by examiner

US 10,433,572 B2

PROCESS FOR FAST AND HOMOGENEOUSLY HEATING A LIQUID PRODUCT AND APPARATUS FOR SUCH PROCESS

CROSS REFERENCE TO RELATED APPLICATIONS

The present application is a National Stage of International Application No. PCT/NL2013/050202 filed on Mar. 19, 2013, which claims the benefit of European Application No.: 12160363.3 filed Mar. 20, 2012, which claims the benefit of Brazil Application No.: BR1020120062631, filed Mar. 20, 2012, the entire disclosures of which are incorporated herein by reference.

FIELD OF THE INVENTION

The present invention relates to a process for fast and homogeneously heating a liquid product to a heating temperature by means of resistive heating and to an apparatus suitable for such process.

BACKGROUND OF THE INVENTION

Pasteurisation and sterilisation of liquid food products such as milk or fruit juices is usually done by convective heating processes, such as a batch-wise retort cooking or continuous HTST (High Temperature Short Time) processes.

Heating of food products by means of an electric field treatment has been proposed.

In U.S. Pat. No. 6,214,297 for example is disclosed an pulsed electric field (PEF) treatment of food products, wherein a food product in a treatment chamber that forms part of an electric circuit, is subjected to high-voltage bipolar pulses. The aim of the treatment is to induce stress and mortality in biological cells. The electric circuit used in the process of U.S. Pat. No. 6,214,297 comprises an energy storage component, typically a capacitor, for storing electrical energy that is discharged from time to time as an electrical pulse to the food product.

In WO2011/139144 is disclosed a method and system for treating a solid food product, wherein the food product is subjected to a pulsed electric field for the disruption of the cells of the food product (so-called e-cooking). As in the process of U.S. Pat. No. 6,214,297, a pulsed electrical field is used. In the process of WO2011/139144, a relatively low field strength is used. Between the pulses, there is a pause time, typically of 0.1 seconds.

In H. L. M. Lelieveld, *Encyclopedia of Biotechnology in Agriculture and Food* (2011) p. 575-578, is mentioned pulsed electric field processing of orange juice to achieve the same effect as in thermal pasteurisation.

In WO2009/111640 is disclosed a system and method for electrically heating a liquid, wherein the liquid is subjected to alternating current or to pulsed direct current at a high frequency. In the method of WO2009/111640 an electrical current is generated through the liquid to be treated that is sufficient to produce resistive heating of the liquid and to break at least some molecular bonds of molecules defining the liquid. The method of WO2009/111640 is used for heating and at the same time treating water of e.g. hot tubes and swimming pools. Both resistive heating and electrolysis occurs. The water is thus simultaneously heated and treated by the free oxygen obtained in electrolysis of the water or by free chlorine obtained in the electrolysis of salt added to the water.

In U.S. Pat. No. 5,863,580 is disclosed a method for resistive heating of liquid egg, wherein the product is pasteurised without substantial electrolysis. In the method of U.S. Pat. No. 5,863,580, the material to be treated has a high electrical resistance, i.e. at least 100, but preferably more than 1000 ohms, and the method is thus operated at low current levels. Also, electrical current of a low frequency is used, i.e. 400 Hz or lower, preferably below 100 Hz.

A disadvantage of using low frequencies is that this will lead to electrode degeneration and thus to undesired poisoning of the liquid product to be heated. In the method of U.S. Pat. No. 5,863,580, special measures are taken to lower the current density in the fluid close to the electrodes.

Although the concept of electrical heating of liquid products has been mentioned in the prior art, a process for electrical heating of liquid products has not yet been reduced to practice.

SUMMARY OF THE INVENTION

The present inventors have found an apparatus suitable for carrying out a novel process for very fast and homogeneous resistive heating of a liquid product in practice. The apparatus comprises at least two heating chambers in series. The novel process that can be carried out in the apparatus according to the invention does not use a pulsed electrical field, but instead a constant electrical field with continuous reversion of the direction of the electrical field at high frequency. The process can suitably be applied for heating liquid products, in particular for the pasteurization of liquid food products. The process is carried out in such a way that substantially no degeneration of electrodes and substantially no electrolysis occurs, thus avoiding undesired contamination. Moreover, the resulting heated liquid product has a product quality in terms of appearance, taste, flavour and nutrient content that is surprisingly close to the quality of the product prior to heating.

Accordingly, the invention relates to an apparatus for fast and homogeneously heating a liquid product to a heating temperature by means of resistive heating, the apparatus comprising at least two vertically mounted, longitudinal, heating chambers that are arranged in series in a vertical arrangement, each chamber having a lower end and an upper end and an inlet for liquid at one end and an outlet for liquid at the other end, wherein each heating chamber defines a longitudinal flow path for liquid between its inlet and its outlet and the arrangement of the at least two heating chambers in series defines a vertical liquid flow path through the at least two heating chambers, wherein each heating chamber is provided with a first electrode at its lower end and a second electrode at its upper end and the first and second electrode of each chamber are separated by an electrical insulator, and the second electrode of a preceding chamber is the first electrode of the next chamber in series and together form a connecting electrode, wherein the electrodes are arranged such that liquid flowing through the vertical liquid flow path through the at least two heating chambers during normal operation of the apparatus, is in contact with the first and with the second electrode of each heating chamber, wherein the first electrode of the lowest heating chamber of the vertical arrangement and the second electrode of the upper heating chamber of the vertical arrangement are electrically grounded, wherein each connecting electrode is electrically connected to a direct current (DC) power source to apply an electrical charge to each connecting electrode, wherein the connection to the DC power source is in such configuration that the polarity of the electrical charge of each connecting electrode can be continuously reversed at a frequency of at least 500 Hz and the electrical charge of adjacent connecting electrodes is opposite.

The apparatus is suitable for carrying out a novel process for electrical heating of a liquid product without the disadvantages of prior art electrical heating processes.

Accordingly, the invention further relates to a process for fast and homogeneously heating a liquid product to a heating temperature by means of resistive heating in an apparatus as hereinbefore defined, comprising
(a) continuously supplying the liquid product to the inlet of the first heating chamber in series and flowing the liquid product continuously through the vertical liquid flow path through the at least two heating chambers in such a way that the liquid product is in contact with the first and with the second electrode of each heating chamber;
(b) continuously generating an electrical current through the liquid product flowing through the heating chambers by continuously applying an electrical potential over the first and second electrode of each heating chamber, wherein the direction of the current is continuously alternated with a frequency of at least 500 Hz, to obtain heated liquid product; and
(c) continuously discharging heated liquid product from the last heating chamber in series via its outlet,
wherein the liquid product has an electrical conductivity of at least 0.03 S/m.

The process according to the invention is particularly suitable for pasteurisation of liquid food products such as fruit juices, dairy products, soups, sauces, and tomato puree. It has been found that by applying the process according to the invention, a liquid food product with an extended shelf life and improved quality in terms of taste, flavour, colour and nutrient content is obtained as compared to a product pasteurised by means of known pasteurisation methods including HTST processes.

An important advantage of the process according to the invention is that the heating is very fast and very homogeneous. Because the heating is so homogeneous, a lower heating temperature is needed in order to achieve the same effect in terms of reduction of micro-organisms. Moreover, no holding time is needed for evening out temperature differences, as is the case in the known convective heating processes.

DETAILED DESCRIPTION OF THE INVENTION

Figure 1:
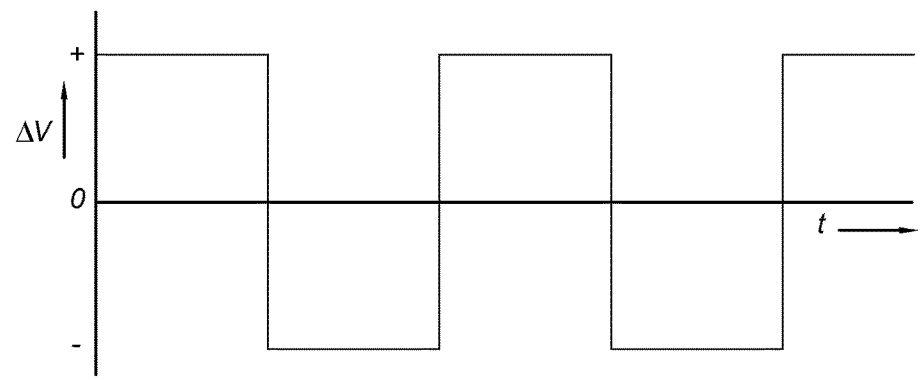
In FIG. 1 is shown a diagram of the electrical potential applied over a heating chamber as a function of time.

The apparatus according to the invention comprises at least two vertically mounted, longitudinal, heating chambers that are arranged in series in a vertical arrangement. Each chamber has a lower end and an upper end and has an inlet for liquid at one end and an outlet for liquid at the other, i.e. the opposite, end. Each heating chamber defines a longitudinal flow path for liquid between its inlet and its outlet. The arrangement of the at least two heating chambers in series defines a vertical liquid flow path through the at least two heating chambers. The inlet of each heating chamber may be at its lower end or at its upper end, preferably at its lower end.

Each heating chamber is provided with a first electrode at its the lower end and a second electrode at its upper end. The first and second electrode of each chamber are separated by an electrical insulator. The second electrode of a preceding chamber is the first electrode of the next chamber in series. Thus, between two adjacent heating chambers there is a connecting electrode that is at the same time the second electrode of the preceding chamber and the first electrode of the next chamber in series. In case of three heating chambers in series the arrangement has two connecting electrodes, i.e. between the first and the second and between the second and the third heating chamber.

The electrodes are arranged such that if, during normal operation of the apparatus, liquid is supplied to the vertical arrangement and flows through the vertical liquid flow path through the at least two heating chambers, such liquid is in contact with the first and with the second electrode of each heating chamber.

The first electrode of the lowest heating chamber of the vertical arrangement and the second electrode of the upper heating chamber of the vertical arrangement, i.e. the electrodes at the lower end and at the upper end of the vertical arrangement, are grounded. Each connecting electrode, i.e. each electrode between two adjacent chambers, is electrically connected to a direct current (DC) power source to apply an electrical charge to each connecting electrode. The connection to the DC power source is in such configuration that the polarity of the electrical charge of each connecting electrode can be continuously reversed at a frequency of at least 500 Hz, preferably at least 1 kHz, more preferably at least 2 kHz, even more preferably at least 10 kHz. In case of more than one connecting electrodes, the configuration is such that the electrical charge of adjacent connecting electrodes is opposite, i.e. if one electrode has a negative charge, the adjacent one(s) has a positive charge.

Preferably, the DC power source is connected to the interconnecting electrode(s) in a H-bridge configuration or a half-bridge configuration. In case of an apparatus with two heating chambers, the DC power source is preferably connected to the connecting electrode in a half-bridge configuration. In case of at least three heating chambers, the DC power source is preferably connected to the interconnecting electrodes in an H-bridge configuration.

More preferably, the apparatus has at least three, even more preferably three vertically mounted, longitudinal, heating chambers and each electrode between two adjacent heating chambers is connected to the DC power source in H-bridge configuration. An H-bridge configuration is a very energy efficient way of alternating polarity. An H-bridge configuration is preferably provided by means of a full H-bridge connected to a single DC power source. Alternatively the H-bridge configuration may be provided by means of two half-bridges, each connected to a separate DC power source.

Reference herein to a longitudinal heating chamber is to a heating chamber having a length that is larger than its diameter. Reference herein to length of the heating chamber is to the distance between the first and the second electrode of the heating chamber. Reference herein to the diameter of the heating chamber is to its largest diameter. Preferably, each heating chamber has a length to diameter ratio of at least 1.3, more preferably at least 1.5, even more preferably in the range of from 2.0 to 5.0.

The heating chambers may have any suitable shape. Preferably, the heating chambers are cylindrical heating chambers. Preferably, each heating chamber has the same shape and/or size. In particular, the distance between the first and the second electrode of each heating chamber and the cross-sectional area of the flow path defined by each heating chamber is substantially the same. Reference herein to substantially the same is to distances or cross-sectional areas that deviate less than 10%, preferably less than 5%, more preferably less than 2% from each other. The dimensions of the heating chambers are preferably such that, during normal operation of the apparatus, liquid product flows in plug flow through the heating chambers. The heating chamber may have any suitable diameter. Preferably, the diameter is in the range of from 5 to 500 mm, more preferably of from 10 to 200 mm, even more preferably 20 to 100 mm. The length is preferably in the range of from 10 to 1,000 mm, more preferably of from 20 to 500 mm.

Preferably, the ratio of the distance between the first and the second electrode of each heating chamber and the cross-sectional area of the flow path defined by each heating chamber is in the range of from 5 to 500 m$^{-1}$, more preferably of from 25 to 100 m$^{-1}$.

Preferably, the apparatus further comprises a cooler for cooling liquid product that is, during normal operation, discharged from the outlet of the last heating chamber in series. Preferably, such cooler is an indirect heat exchange cooler. Such cooler suitably comprises one or more heat exchange tubes comprising an inlet and an outlet, wherein the inlet of the one or more tubes is in fluid communication with the outlet of the last heating chamber. The cooler may comprise a single tube or a plurality of parallel tubes. Tubular heat exchange coolers are well-known in the art. The apparatus may comprise any suitable tubular heat exchanger cooler known in the art.

Preferably, the apparatus further comprises a preheater for preheating a liquid product prior to supplying such product to the inlet of the first heating chamber by means of indirect heat exchange. The preheater suitably comprises one or more heating tubes, the one or more tubes comprising an inlet and an outlet, wherein the outlet of the one or more tubes is in fluid communication with the inlet of the first heating chamber. The preheater may comprise a single tube or a plurality of parallel tubes. Tubular heat exchanger heaters are well-known in the art. The apparatus may comprise any suitable tubular heat exchanger heater known in the art.

In the process according to the invention, a liquid product with an electrical conductivity of at least 0.03 S/m is fast and homogeneously heated to a heating temperature by means of resistive heating in an apparatus as hereinbefore defined. The process comprises:
a) continuously supplying the liquid product to the inlet of the first heating chamber in series and flowing the liquid product continuously through the vertical liquid flow path through the at least two heating chambers in such a way that the liquid product is in contact with the first and with the second electrode of each heating chamber;
(b) continuously generating an electrical current through the liquid product flowing through the heating chambers by continuously applying an electrical potential over the electrodes of each heating chamber, wherein the direction of the current is continuously alternated with a frequency of at least 500 Hz, to obtain heated liquid product; and
(c) continuously discharging heated liquid product from the last heating chamber in series via its outlet.

The liquid product may flow in upward or in downward direction through the heating chambers. Preferably, in order to avoid or minimise the occurrence of gas bubbles, the liquid product is flowing upwards.

In the process according to the invention, a continuous electrical potential is applied over the electrodes of each heating chamber and the liquid product has an electrical conductivity of at least 0.03 S/m. Thus, a continuous electrical current is generated through the liquid product flowing in each heating chamber between the first and the second electrode.

In order to minimize degeneration of the electrodes, the direction of the current is continuously alternated with a frequency in the range of at least 500 Hz, preferably at least 1 kHz, more preferably at least 2 kHz, even more preferably at least 10 kHz. Such alternating of the current is done by continuously reversing the electrical charge applied to each connecting electrode and therewith reversing the electrical potential over the electrodes of each heating chamber. Reversing the potential, and therewith the current, may be done by any suitable means known in the art. Preferably, the potential is reversed by means of an H-bridge of half-bridge configuration of the electrical circuit formed by the DC power source, the electrodes to which the source is connected and the conductive liquid product in contact with the electrodes. Preferably, the frequency of alternating of the direction of the current is at most 200 kHz, more preferably at most 100 kHz.

In the process according to the invention, a continuous electrical current is generated by applying a continuous electrical potential over the electrodes of each heating chamber. This is to be contrasted with the application of pulsed current wherein there is a pause time between current pulses applied. An advantage of applying a continuous electrical current instead of a pulsed current is that no capacitor or other energy storage element is needed.

In the process according to the invention, the direction of the electrical potential, and therewith of the current, is continuously alternated, preferably without changing the strength of the electrical field. Thus, the polarity is preferably reversed without changing the strength of the electrical potential applied. The shape of a diagram showing the electrical potential applied over the first and second electrode of each heating chamber as a function of time thus preferably is a block wave as shown in FIG. 1 (block shape). This is to be contrasted with the sine shape of alternating current that is typically supplied by mains power systems. The polarity is preferably reversed within 10 milliseconds, more preferably within one millisecond.

The process according to the invention is preferably carried out in such way that the liquid product is heated in the heating chambers by means of resistive heating (ohmic heating) with substantially no electrolysis of molecules defining the liquid product occurring. Reference herein to substantially no electrolysis of molecules defining the liquid product occurring is to less than 0.1%, preferably less than 0.05%, more preferably less than 0.01% of the molecular bonds of molecules defining the liquid product being broken by electrolysis.

In the process according to the invention, a liquid product is heated by means of resistive heating. In order to allow resistive heating to occur without substantial electrolysis of molecules of the liquid product, the liquid product has an electric conductivity of at least 0.03 S/m, preferably at least 0.05 S/m, more preferably at least 0.1 S/m.

It will be appreciated that for a desired current through the liquid (desired in order to effect resistive heating without substantial electrolysis occurring), the electrical potential to be applied over the electrodes will inter alia depend on the conductivity of the liquid product to be heated and the length and cross-sectional area of the heating chambers. Any suitable electrical potential can be used. Preferably, the electrical potential will be in the range of from 500 to 10,000 volts, more preferably of from 1,000 to 5,000 volts.

If the electrical potential is given, the dimensions of the heating chamber will be chosen such that, given the conductivity of the product to be heated, resistive heating will occur.

Preferably, the ratio between length and cross-sectional area of the heating chamber is in the range of from 5 to 500 $m^{-1}$, more preferably of from 25 to 100 $m^{-1}$.

Preferably, the electrical potential applied over the electrodes of each heating chamber and the dimensions of the heating chamber are chosen such that the electrical field strength over the each heating chamber is in the range of from 0.1 to 20 kV/cm, more preferably of from 0.5 to 10 kV/cm, even more preferably of from 1 to 5 kV/cm.

Surprisingly, it has been found that the process according to the invention is capable of very fast and very homogeneously heating a continuously flowing liquid product. The heating is so fast that even at low residence times and relatively high liquid flow rates, the desired heating temperature is achieved. Preferably, the residence time of the liquid product in the (total of the) heating chambers is at most 1 second, more preferably at most 0.5 seconds, even more preferably at most 0.3 seconds, still more preferably at most 0.1 seconds, still more preferably at most 0.01 seconds. Preferably, the flow rate of the liquid product is at least 10 liters per hour, more preferably at least 50 liters per hour, even more preferably at least 100 liters per hour. Flow rates are preferably up to 50,000 liters per hour.

It has been found that by vertically mounting the heating chambers, the heating is substantially more homogeneous than with horizontally mounted heating chambers.

Homogeneity of heating is usually expressed as the deviation in temperature with respect to the average temperature at the outlet of a heating zone. In a conventional convective pasteurisation process with an average heating temperature of about 75° C., the local temperature of a heated product at any location at the outlet of a heating tube can deviate as much as 20° C. from the average temperature (so-called cold or hot spots). Such deviations are due to differences in flow velocity of the liquid through the heating tubes and to the inherent slowness of convective heating. In view of the occurrence of cold spots in conventional processes, a higher average outlet temperature (set temperature) is need than would be needed without cold spots. Also, in convective heating processes, a holding zone is typically applied downstream of a heating zone, for evening out temperature differences and making sure that the required pasteurisation of sterilisation temperature is achieved throughout the product for a sufficient long time, prior to cooling the product.

In the process according to the invention, the deviation from the average temperature at any point in the liquid product at the outlet of the last heating chamber in series is typically less than 3° C., usually even less than 1° C. Therefore, a lower set temperature can be used and no holding of the product in a holding tube or zone downstream of the heating chambers is needed. Preferably, the liquid product is cooled immediately after being discharged from the last heating chamber.

Cooling of the product discharged from the last heating chamber may be carried out by any suitable means known in the art, for example by means of indirect cooling such as convective heat exchange, or by means of direct cooling such as expansion of the product. Preferably, indirect cooling is used. The product may be cooled to any temperature desired for further processing or packaging. Preferably, the liquid product is cooled to a temperature below 50° C., more preferably below 25° C.

An important advantage of the process according to the invention is that the product can be heated to a lower pasteurisation or sterilisation temperature to achieve the same effect in terms of killing of micro-organisms, as compared with conventional convective heating processes. Since the heating is so homogeneous, no or lower safety margins for the heating temperature need to be built in. By heating to a lower temperature, the product quality is improved, since less chemical degradation of compounds that will affect the flavour, taste, colour and nutrient content will occur.

Since the heating in the process according to the invention is very fast and very homogeneous, a product with a good product quality in combination with a shelf life that is increased compared to an untreated product, can be achieved. Therefore, the process according to the invention is particularly suitable for the heating of liquid food products. Reference herein to a liquid product is to a product having a viscosity such that the product is pumpable through the heating chamber. Such liquid product may comprise solid particles in a liquid continuous phase. Preferably, the liquid product is a product having a viscosity of at most 0.3 Pa·s at 20° C., more preferably at most 0.005 Pa·s at 20° C. Examples of suitable liquid food products include, but are not limited to, fruit juices, liquid dairy products, soups, sauces, and tomato puree.

The process may be a process for thermalisation, pasteurisation, or sterilisation of a liquid food product. Preferably, the process is a process for the pasteurisation of a liquid food product. The liquid food product may be heated to any suitable heating temperature, preferably to a pasteurisation temperature in the range of from 60 to 90, more preferably in the range of from 70 to 85° C.

The process according to the invention may be carried out at any suitable pressure. Preferably, the liquid product flowing through the heating chambers is at a pressure of at most 100 bar (absolute), more preferably at most 50 bar (absolute), even more preferably at a pressure in the range of from 1 to 10 bar (absolute).

It is preferred to preheat the liquid product before supplying the liquid product to the inlet of the first heating chamber. Preferably, the liquid product is preheated to a temperature in the range of from 30 to 50° C. Suitably, the liquid product is preheated by means of convective heating, for example in a tubular heat exchanger having an outlet that is in fluid communication with the inlet of the first heating chamber. Preheating by means of convective heat exchange reduces the costs of the process, since convective heating is less expensive than electrical heating. For preheating up to temperatures of about 50° C., there is no need to use very fast and homogeneous heating, since chemical degradation does not or hardly occur below 50° C.

It will be appreciated that the process according to the invention can only be operated with the vertical flow path through the at least two heating chambers filled with liquid. In order to avoid contamination of any tubes downstream of the heating chambers, it is preferred to start the process according to the invention by filling the heating chambers and any liquid flow path upstream and downstream of the heating chambers with a sterile liquid having substantially the same conductivity and preferably also substantially the same pH as the liquid product to be heated. Therefore, the process preferably further comprises a start-up phase prior to carrying out process steps (a) to (c), the start-up phase comprising filling the heating chambers and any liquid flow path upstream and downstream of the heating chambers with a sterile liquid having substantially the same conductivity as the liquid product. Reference herein to substantially the same conductivity is to a conductivity that deviates at most 0.01 S/m or at most 10%, whichever is the largest, from the conductivity of the liquid product to be heated. More preferably, the sterile liquid has substantially the same conductivity and substantially the same pH value as the pH value of the liquid product. Reference herein to substantially the same pH value is to a pH value that deviates at most 1.0, preferably at most 0.5, more preferably at most 0.2 from the pH value of the liquid product to be heated. Reference herein to a sterile liquid is to a liquid that has less pathogenic micro-organisms per volume than the liquid product after having been treated by the process according to the invention. The sterile liquid may for example be heat-treated liquid product or a heat-treated salt solution, preferably a heat-treated salt solution. Preferably, the liquid is heat-treated by conventional heat exchange. Once the heating chamber and any further liquid flow path is filled with sterile liquid, the process is started by generating an electrical current as hereinbefore described through the sterile liquid. The sterile liquid is then replaced by the liquid product by continuously supplying liquid product to the inlet of the first heating chamber in series.

Detailed Description of the Drawings

In FIG. 1 is shown a diagram of the electrical potential applied over the first and the second electrode of a single heating chamber as a function of time. The Figure shows that the diagram has the shape of a block wave.

Figure 2:
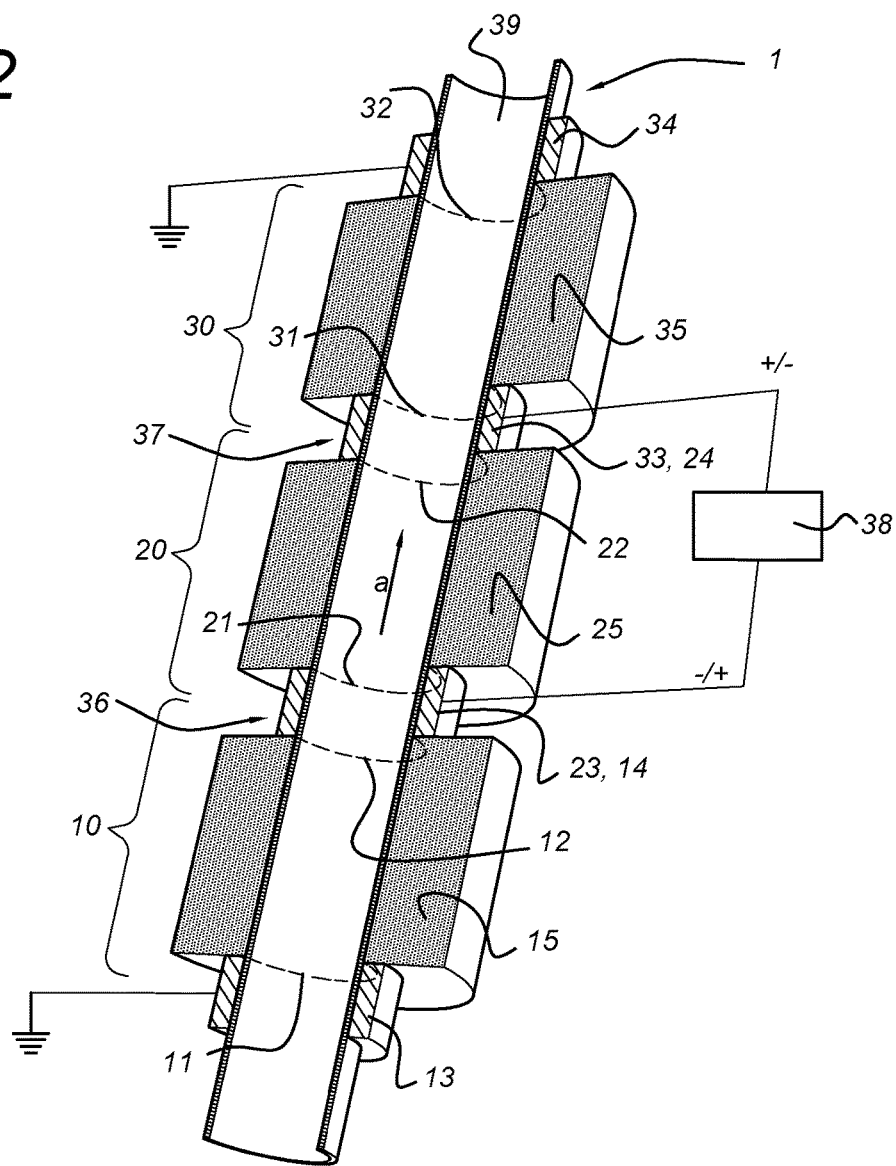
In FIG. 2 is shown a longitudinal section of a vertical arrangement of three vertically mounted heating chambers in series as applied in a preferred embodiment of the apparatus and process according to the invention.

In FIG. 2 is schematically shown a longitudinal section of an arrangement of three heating chambers in series as applied in a preferred embodiment of the apparatus and process according to the invention. In FIG. 2 is shown an arrangement 1 comprising three heating chambers 10, 20, and 30 in series. During normal operation of arrangement 1, arrangement 1 is vertically mounted. The first heating chamber 10 in series has an inlet 11 for liquid at its lower end and an outlet 12 for liquid at its upper end. Heating chamber 10 has a first electrode 13 at its lower end and a second electrode 14 at its upper end. The second and third heating chambers 20 and 30 accordingly each have an inlet 21 and 31, respectively, and an outlet 22 and 32, respectively, for liquid and a first electrode 23 and 33, respectively, and a second electrode 24 and 34, respectively. The first and the second electrodes of each chamber 10, 20, and 30 are separated by an electrical insulator 15, 25, 35, respectively. The second electrode 14 of first chamber 10 is the same electrode as first electrode 23 of second heating chamber 20 and forms connecting electrode 36 between adjacent chambers 10 and 20. Accordingly, the second electrode 24 of second chamber 20 is the same electrode as first electrode 33 of third heating chamber 30 and forms connecting electrode 37 between adjacent chambers 20 and 30. The first electrode 13 of the lowest chamber 10 and the second electrode 34 of the upper chamber 30 are electrically grounded. Connecting electrodes 36 and 37 are electrically connected in an H-bridge configuration 38 to a DC power source.

Liquid product is flowing through vertical liquid flow path 39 defined by arrangement 1 of the three heating chambers 10, 20 and 30 in the direction of arrow a.

The invention will further be illustrated by means of the following non-limiting examples.

EXAMPLES

Example 1

Freshly squeezed orange juice having a conductivity of 0.37 S/m at 20° C. and having a temperature of 7° C. was pumped through a convective preheating section to achieve a preheating temperature between 35 and 38° C. The preheated juice was supplied to a vertically mounted cylindrical heating chamber with a length of 20 mm and a diameter of 10 mm at a flow rate of 120 L/h. An electrical field was applied over the heating chamber to generate an electrical current through the orange juice flowing through the chamber and the direction of the current was reversed with a frequency of 1 kHz. The residence time of the orange juice in the heating chamber was 0.1 seconds at a back-pressure of 2 bar (absolute).

Various experiments were carried out as described hereinabove, each with a different strength of the electrical field applied. The maximum voltage and current applied at an outlet temperature of 85° C. yielded 1200V/5A. The field strength under these conditions was approx. 600 V/cm. At lower voltage settings the current was reduced and the outlet temperature decreased. In this way the outlet temperature was controlled and samples were collected under stationary conditions for a series of outlet temperatures in the range of 60-85° C. After cooling, the orange juice was bottled at temperatures below 15° C. and stored at a temperature of 7° C. Microbial shelf life, enzyme activity and quality parameters of the orange juice were measured at indicated times for a period of four months and compared to the same parameters for untreated juice and for conventionally treated juice (convective heating for 300 seconds at 80° C.

In order to determine microbial shelf life, the amount of yeasts and moulds, and lactic acid bacteria were measured on days 0, 1, 2, 6, 9, 12, 14, 21, 28, 35, 42, 49, 56, 63, 70, 77, 84 and 150 for, according to ISO 21527-1 and ISO 15214, respectively.

The pectin methylesterase (PME) activity after two days storage was measured as described in L. Vervoort et al., *Innovative Food Science and Emerging Technologies*, 12 (2011), p 466-477.

The colour of the different samples after two days of storage was determined by measuring Hunter values L*, a*, b* as described in R. A. H Timmermans et al, *Innovative Food Science and Emerging Technologies*, 12 (2011), p 235-243. The L, a and b values were used to calculate the ΔE value as follows:

$$\Delta E = ((a-a_0)^2 + (b-b_0)^2 + (L-L_0)^2)^{1/2}$$

wherein the subscript '0' indicates the colour of the untreated orange juice at a storage time of 0 days.

For sensorial evaluation, the samples were scored by a panel on intenseness of citrus smell and on freshness on days 2, 6, 9, 12, 14, 21, 28, 35, 42, 49, 56, 63, 70, 75, 77, 84, and 150.

In Table 1 is shown the results of the sensorial evaluation. In Table 2 is shown the results of the PME activity measurements and of the colour measurements.

TABLE 1

Sensorial evaluation of untreated and treated orange juice samples

| Exp. | T heating (° C.) | Microbial shelf life (days) | Sensorial evaluation |
|---|---|---|---|
| A | 85 | At least 150 days | Directly after processing comparable to untreated juice (taste, intensity, aftertaste and colour). Fresh and citrus tones present until t = 35 days, then citrus intensity lowers a little, but is still present until t = 71 days, then deterioration. At t = 150 days still good tasting, but not comparable to 'fresh'. |
| B | 75 | At least 84 days | As for experiment A, but at t = 84 days, juice B is preferred over juice A. |
| C | 63 | 28-35 days | Directly after processing comparable to untreated juice (taste, intensity, after-taste and colour). Very fresh and citrus tones until t = 28 days, then deterioration starts. At = 35 days insufficient. |
| un-treated | — | 6-9 days | Most intense citrus tones and fresh taste at t = 0 days. As from t = 2 days, deterioration starts. Insufficient at t = 9 days. |
| conven-tional | 80 | At least 90 days | Directly after processing, a flattening of taste. No fresh citrus taste anymore, and 'processed' taste. Colour of the juice was browner, compared to untreated. Taste was stable over storage time |

TABLE 2

PME activity and colour after two days of storage

| Experiment | T heating (° C.) | PME activity | Colour at t = 2 days L*, a*, b* | ΔE value at t = 2 days |
|---|---|---|---|---|
| A | 85 | <5% | 54.42, 10.49, 60.20 | 2.7 |
| B | 75 | <30% | 54.23, 10.46, 59.31 | 2.5 |
| C | 63 | >95% | 53.80, 10.59, 59.94 | 2.1 |
| untreated | | 100% | 52.31, 10.55, 57.94 | 1.7 |
| conventional | 80° C., 300 s | <5% | | |

Example 2

Freshly squeezed orange juice having a conductivity of 0.35 S/m at 15° C. and an inlet temperature of 7° C. was pumped through a convective preheating section. The preheated juice was supplied to three vertically mounted cylindrical heating chambers in series, each with a diameter of 26 mm and a length of 50 mm, at a flow rate of 1500 L/h. An electrical field was applied over the heating chamber to generate an electrical current through the orange juice flowing through the chamber and the direction of the current was reversed with a frequency of 1 kHz. The outlet temperature was 85° C. The orange juice discharged from the heating chamber was cooled directly inline, and bottled at a temperature below 8° C. and stored at a temperature of 4° C. Microbial shelf life, enzyme activity and other quality parameters of the treated orange juice were measured at indicated times during a period of 6 months and compared to the same quality parameters for untreated juice and for conventionally heat-treated juice (92° C., 15 seconds) from the same batch of freshly squeezed orange juice.

In order to determine microbial shelf life, the amount of yeast and moulds, and lactic acid bacteria were measured on days 3, 10, 28, 56, 90, 125, 153, 180 according to ISO 21527-1 and ISO 15214, respectively. On the same days, the pectin methyl esterase (PME) activity was measured as described by L. Vervoort et al, *Innovative Food Science and Emerging Technologies*, 12 (2011), p 466-477, and a sensorial evaluation by a panel, scoring on intenseness of citrus smell and on freshness on a scale ranging from very good (++) to very bad (--). The results are shown in Table 3.

TABLE 3

Evaluation of untreated, conventionally heated and electrically heated orange juice

| Treatment | Storage at 4° C. | Microbiology | | | PME activity Relative PME activity (%) | Sensorial |
| | | Yeast [cfu/mL] | Moulds [cfu/mL] | Lactic acid bacteria [cfu/mL] | | |
|---|---|---|---|---|---|---|
| untreated | 3 days | 2.50E+04 | 1.50E+02 | 6.70E+03 | 100% | ++ |
| conventional | 3 days | <10 | <10 | <100 | <1% | 0 |
| electrical (invention) | 3 days | <10 | <10 | <100 | <1% | + |
| electrical (invention) | 28 days | <10 | <10 | <100 | <1% | + |
| electrical (invention) | 56 days | <10 | <10 | <100 | <1% | + |
| electrical (invention) | 90 days | <10 | <10 | <100 | <1% | + |
| electrical (invention) | 125 days | <10 | <10 | <100 | <1% | + |
| electrical (invention) | 153 days | <10 | <10 | <100 | <1% | + |
| electrical (invention) | 180 days | <10 | <10 | <100 | <1% | + |

The invention claimed is:

1. An apparatus for fast and homogenous heating of a liquid product to a heating temperature by resistive heating, comprising at least two vertically mounted, longitudinal, heating chambers that are arranged in series in a vertical arrangement, each chamber having a lower end and an upper end and an inlet for liquid at one end and an outlet for liquid at the other end,
   wherein each heating chamber defines a longitudinal flow path for liquid between its inlet and its outlet and the arrangement of the at least two heating chambers in series defines a vertical liquid flow path through the at least two heating chambers,
   wherein each heating chamber is provided with a first electrode at its lower end and a second electrode at its upper end, and the first and second electrode of each chamber are separated by an electrical insulator, and the second electrode of a preceding chamber is the first electrode of the next chamber in series and together form a connecting electrode,
   wherein the electrodes are arranged such that liquid flowing through the vertical liquid flow path through the at least two heating chambers during normal operation of the apparatus is in contact with the first and with the second electrode of each heating chamber,
   wherein the first electrode of the lowest heating chamber of the vertical arrangement and the second electrode of the upper heating chamber of the vertical arrangement are electrically grounded,
   wherein each connecting electrode is electrically connected to a direct current (DC) power source to apply an electrical charge to each connecting electrode,
   wherein the DC power source is configured to apply electrical potential as a function of time over the electrodes in the form of a block wave by applying the electrical potential for a first time period and then reversing the polarity of the electrical potential during a second time period after the first time period between the connecting electrode and the first electrode of the preceding chamber, and between the connecting electrode and the second electrode of the next chamber, so as to repeat consecutive applications of the electrical potential with continuous reversion of the polarity over time across the electrodes of each heating chamber, and in which the electrical potential is applied so as to generate a continuous electrical current though the liquid product in each of the heating chambers between the first and second electrodes, and
   wherein the continuous reversion of the polarity of the electrical potential of each connecting electrode is at a frequency of at least 500 Hz, with the electrical charge of adjacent connecting electrodes being opposite.

2. The apparatus according to claim 1 with two heating chambers in series and wherein the electrode between the heating chambers is connected to the DC power source in half-bridge configuration.

3. The apparatus according to claim 1 having at least three vertically mounted, longitudinal, heating chambers and wherein each electrode between two adjacent heating chambers is connected to the DC power source in H-bridge configuration.

4. The apparatus according to claim 3 with at least three heating chambers in series.

5. The apparatus according to claim 4, wherein the ratio of the distance between the first and the second electrode of each heating chamber and the cross-sectional area of the flow path defined by each heating chamber is in the range of from 5 to 500 m−1.

6. The apparatus according to claim 3, wherein the distance between the first and the second electrode of each heating chamber and the cross-sectional area of the flow path defined by each heating chamber is substantially the same.

7. The apparatus according to claim 1, wherein the distance between the first and the second electrode of each heating chamber and the cross-sectional area of the flow path defined by each heating chamber is substantially the same.

8. The apparatus according to claim 1, wherein the ratio of the distance between the first and the second electrode of each heating chamber and the cross-sectional area of the flow path defined by each heating chamber is in the range of from 5 to 500 m−1.

9. A process for fast and homogeneously heating a liquid product to a heating temperature by resistive heating in an apparatus according to claim 1, the process comprising:
   (a) continuously supplying the liquid product to the inlet of the first heating chamber in series and flowing the liquid product continuously through the vertical liquid flow path through the at least two heating chambers in such a way that the liquid product is in contact with the first and with the second electrode of each heating chamber;
   (b) continuously generating an electrical current through the liquid product flowing through the heating chambers by continuously applying an electrical potential over the first and second electrode of each heating chamber so as to continuously provide a constant electrical field strength between a connecting electrode and a first electrode of a preceding chamber, and between a connecting electrode and a second electrode of a next chamber, wherein the direction of the electrical current is continuously alternated with a frequency of at least 500 Hz, such that the electrical potential applied over said electrodes as a function of time has the shape of a block wave, to obtain heated liquid product, wherein the electrical current is provided by a DC power source configured to apply the electrical potential for a first time period and then reverse the polarity of the electrical potential during a second time period after the first time period between the connecting electrode and the first electrode of the preceding chamber, and between the connecting electrode and the second electrode of the next chamber, so as to repeat consecutive applications of the electrical potential with continuous reversion of the polarity over time across the electrodes of each heating chamber; and
   (c) continuously discharging heated liquid product from the last heating chamber in series via its outlet,
   wherein the liquid product has an electrical conductivity of at least 0.03 S/m.

10. The process according to claim 9, wherein substantially no electrolysis of molecules defining the liquid product occurs.

11. The process according to claim 9, wherein the liquid product has an electrical conductivity of at least 0.1 S/m.

12. The process according to claim 9, wherein the electrical potential over the first and second electrode of each heating chamber is in the range of from 500 to 10,000 volts.

13. The process according to claim 9, wherein the liquid product is flowing through the heating chambers at a flow of at least 10 liters per hour.

14. The process according to claim 9, wherein the liquid product is a liquid food product.

15. The process according to claim 14, wherein the food product is fruit juice.

16. The process according to claim 15, comprising a start-up phase prior to carrying out process steps (a) to (c), the start-up phase comprising filling the heating chambers and any liquid flow path upstream and downstream of the heating chambers with a sterile liquid having substantially the same conductivity as the liquid product.

17. The process according to claim 16, wherein the sterile liquid has substantially the same pH value as the pH value of the liquid product.

18. The process according to claim 14, wherein the food product is a liquid dairy product, a soup or a sauce.

19. The process according to claim 18, the process further comprising a start-up phase prior to carrying out process steps (a) to (c), the start-up phase comprising filling the heating chambers and any liquid flow path upstream and downstream of the heating chambers with a sterile liquid having substantially the same conductivity as the liquid product.

20. The process according to claim 19, wherein the sterile liquid has substantially the same pH value as the pH value of the liquid product.

21. The process according to claim 9, wherein the process is a process for pasteurisation of the liquid product and the heating temperature is in the range of from 60 to 90° C.

22. The process according to claim 9, wherein the liquid product is heated to the heating temperature within 1 second.

23. The process according to claim 9, wherein the deviation from the average heating temperature of the liquid product at the outlet of the last heating chamber is at most 3° C.

24. The process according to claim 9, wherein the liquid is preheated to a temperature in the range of from 30 to 50° C. before being supplied to the first heating chamber.

25. The process according to claim 9, wherein the heated liquid product is cooled immediately after being discharged from the last heating chamber.

26. The process according to claim 9, the process further comprising a start-up phase prior to carrying out process steps (a) to (c), the start-up phase comprising filling the heating chambers and any liquid flow path upstream and downstream of the heating chambers with a sterile liquid having substantially the same conductivity as the liquid product.

27. The process according to claim 26, wherein the sterile liquid has substantially the same pH value as the pH value of the liquid product.

* * * * *